United States Patent [19]
Amblank

[11] 3,805,832
[45] Apr. 23, 1974

[54] WATER VALVE UNIT

[75] Inventor: Robert G. Amblank, Beinwil Am See, Switzerland

[73] Assignee: Aktiengesellschaft, Baden, Switzerland

[22] Filed: Sept. 21, 1971

[21] Appl. No.: 182,366

[30] Foreign Application Priority Data
Sept. 29, 1970 Switzerland.................. 14397/70

[52] U.S. Cl............................... 137/606, 251/366
[51] Int. Cl............................................ F16k 11/10
[58] Field of Search ............ 137/606, 615; 251/145, 251/366

[56] References Cited
UNITED STATES PATENTS
| | | | |
|---|---|---|---|
| 3,448,768 | 6/1969 | Keller | 137/606 |
| 1,929,536 | 10/1933 | Schulte | 137/615 X |
| 1,807,900 | 6/1931 | Dougherty | 137/606 X |
| 2,418,448 | 4/1947 | Arbogast | 251/366 X |
| 2,696,361 | 12/1954 | Jensen | 251/145 X |
| 2,657,092 | 10/1953 | Jones | 251/145 |

FOREIGN PATENTS OR APPLICATIONS
1,557,825   1/1969   France ............................. 137/606

Primary Examiner—William R. Cline
Attorney, Agent, or Firm—Browdy and Neimark

[57] ABSTRACT

A water valve unit is disclosed comprising a support made of drawn tubing with hot and cold water valves at either end thereof forming a lateral watertight seal to the support. The valves direct the water into the support tube such that the tube serves both as a guide tube and a mixing chamber.

1 Claim, 6 Drawing Figures

WATER VALVE UNIT

The present invention concerns a water valve unit comprising at least one support made of drawn tubing which is designed to support the valve or valves and carry cold and/or hot water, and further comprising one or several tap pipes, outlets or the like. Such valve units are today mostly nonferrous metal castings or pressings. This method of manufacture is expensive not only because of the casting and pressing, but also because of the subsequent machining necessary.

The object of the present invention is to remedy the said drawbacks by providing a water valve unit characterized in that one or more single-piece valve cases, having a valve seat which is preferably insertable from the front, form the lateral water-tight termination of the valve unit, and that the valve stem and the water connection stub are arranged coaxially with each other and crosswise of the tube axis, the joining between tube and valve case being preferably effected by welding or brazing along the case.

Embodiments of the present invention are now to be described by way of example with reference to the drawings, in which.

Figure 1:
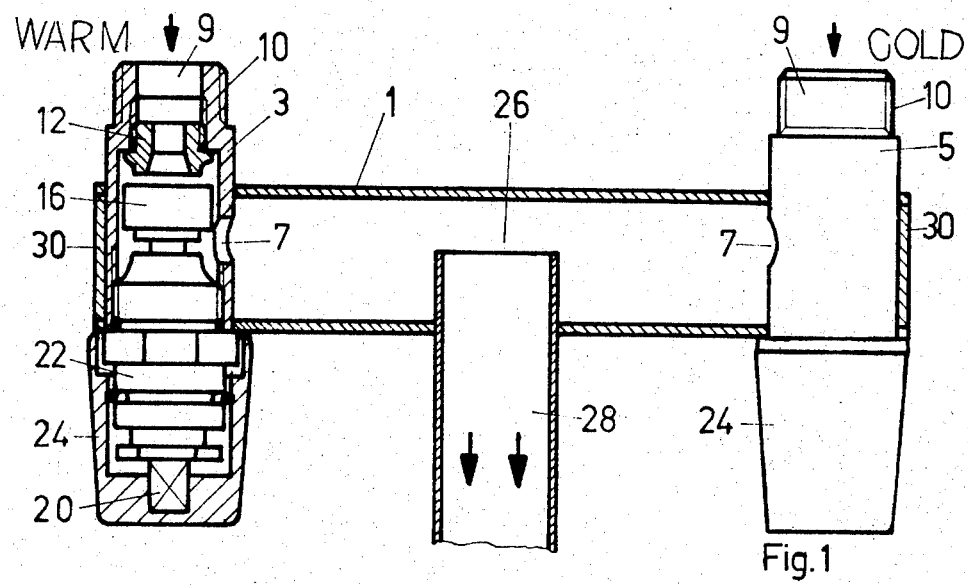
FIG. 1 shows a longitudinal section through a water valve unit comprising cold and hot water connections and valves and also a fixed outlet pipe for the mixed water.

In contrast with the known valve units, whose body, i.e., the common case, is cast, the support 1 shown in FIG. 1 is made of box-section tubing. Instead, of course, the section may be round, oval or polygonal. Fitted to the support 1 at both ends are valve cases 3 and 5, respectively, which are joined by brazing and from the lateral terminations of the support 1, as may be seen at the valve case 5 in FIG. 1. The valve cases 3 and 5 are each provided with an aperture 7 giving access to the interior of the support 1. Inlet stubs 9 with external threading 10 serve to connect a cold water line and a hot water line, or their connecting stubs, by means of cap nuts (not shown).

The said inlet stubs 9 are each provided with internal threading into which is screwed a valve seat 12 and a valve 22 with head 16 and stem 20. Fitted to the squared stem end is a handle 24 which encloses the outward-protruding parts. As this assembly is not part of the invention, it need not be described further.

Arranged between the valve cases 3 and 5 in FIG. 1 is a rigid outlet 28 which may have the form of a pipe. The outlet pipe 28 opens into the support 1 and thus forms a mixing chamber 26 in which the cold and hot water streams can mix and then, as warm water, flow out through the outlet 28.

Figures 2, 3:
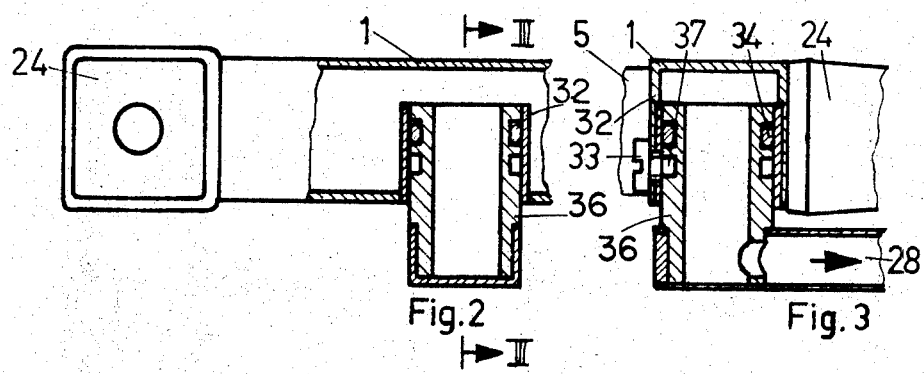
FIG. 2 shows, partly in section, part of another water valve unit from the operator side, with a swivel-joined outlet.
FIG. 3 shows a section along line III—III in FIG. 2.
Figure 4:
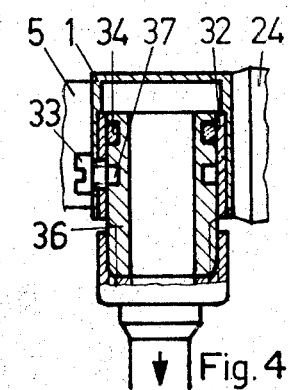
FIG. 4 shows a section through a valve unit with a swivel-joined hose connection.

As shown in FIGS. 2 and 3 the outlet pipe 28 may be swivel-joined or, as shown in FIG. 4, have the form of a flexible hose. Fitted into the support 1 and between the valve cases is a bush 32 in which the swivel-joined outlet pipe is held. Outwards, the outlet pipe 28 is sealed by a ring seal 34. As shown in FIG. 3, the swivel-joined outlet pipe is secured by a bolt 33 projecting into a groove 37 of the swivel joint 36 of the outlet pipe 28 and thus holding the latter at a set height.

Figure 5:
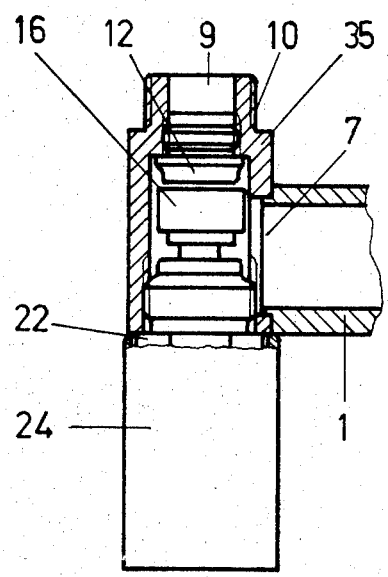
FIG. 5 shows a section through a valve case brazed to the support.

FIG. 5 shows the support 1 with a valve case 35 which is fitted at the side to its end and which comprises the valve seat 12 and the valve 22 with the head 16.

Figure 6:
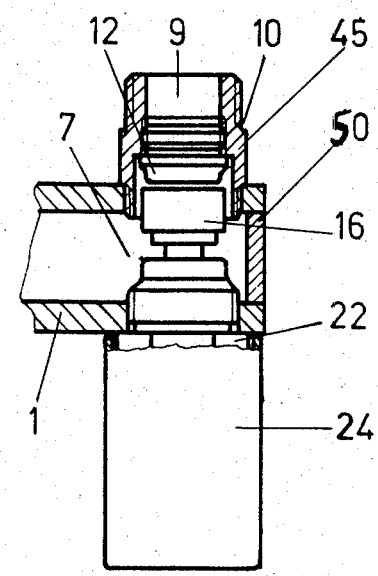
FIG. 6 shows a section through part of a support in which the valve and the connection stub with valve seat are accommodated separately.

FIG. 6 shows the support 1 in which are fitted the valve 22 with the head 16 and a valve seat case 45 with the seat 12. The assembly is terminated by a terminating wall 50 welded into the support 1 with sealing effect.

The foregoing description shows that it is in principle possible to build up a water valve unit in a simple and inexpensive manner, using the simplest of components, such as section tubing, nipples, threaded piping and the like in conjunction with brazing, while still using components of established quality and standard for the essential parts, viz. the shut-off components. For styling, though not functionally necessary, the free ends of the support 1 can be closed by plastic plugs 30 and the whole valve unit can be chromium-plated so as to be fully equal to the known valves even in point of appearance.

I claim:

1. A water valve unit comprising:
    an integrally formed support made of drawn metal tubing having a rectangular cross-section;
    two one-piece metal valve housings comprising bilaterally open straight connections projecting alongside and beyond said support, firmly connected to said support, one each on either end thereof, said housings having a longitudinal axis perpendicular to the longitudinal axis of said support, and forming a lateral termination thereto with the joint made watertight by welding or brazing in such a manner that said valve housings seal said support at its ends, each of said housings having lateral openings therein directed toward the other said housing within said support;
    an outlet pipe connected to said support between the ends thereof;
    valve means within each of said valve housings, each of said valve means including a water connection stub and a valve stem to which is attached a handle, said valve means arranged within said housing with said water connection stub at one end thereof and said valve stem at the other end;
    wherein said support serves both as a guide tube and a mixing chamber for hot and cold water.

* * * * *

UNITED STATES PATENT OFFICE
CERTIFICATE OF CORRECTION

Patent No. 3,805,832                     Dated April 23, 1974

Inventor(s) Robert G. AMBLANK

It is certified that error appears in the above-identified patent and that said Letters Patent are hereby corrected as shown below:

In the title page at line [73], the name of the Assignee: should read:

--Aktiengesellschaft Oederlin & Cie, Baden, Switzerland--

Signed and sealed this 1st day of October 1974.

(SEAL)
Attest:

McCOY M. GIBSON JR.
Attesting Officer

C. MARSHALL DANN
Commissioner of Patents